Feb. 11, 1969    T. A. BRANDON, JR    3,427,582
FAILURE INDICATING APPARATUS FOR A SPLIT BRAKE SYSTEM
Filed Oct. 7, 1965
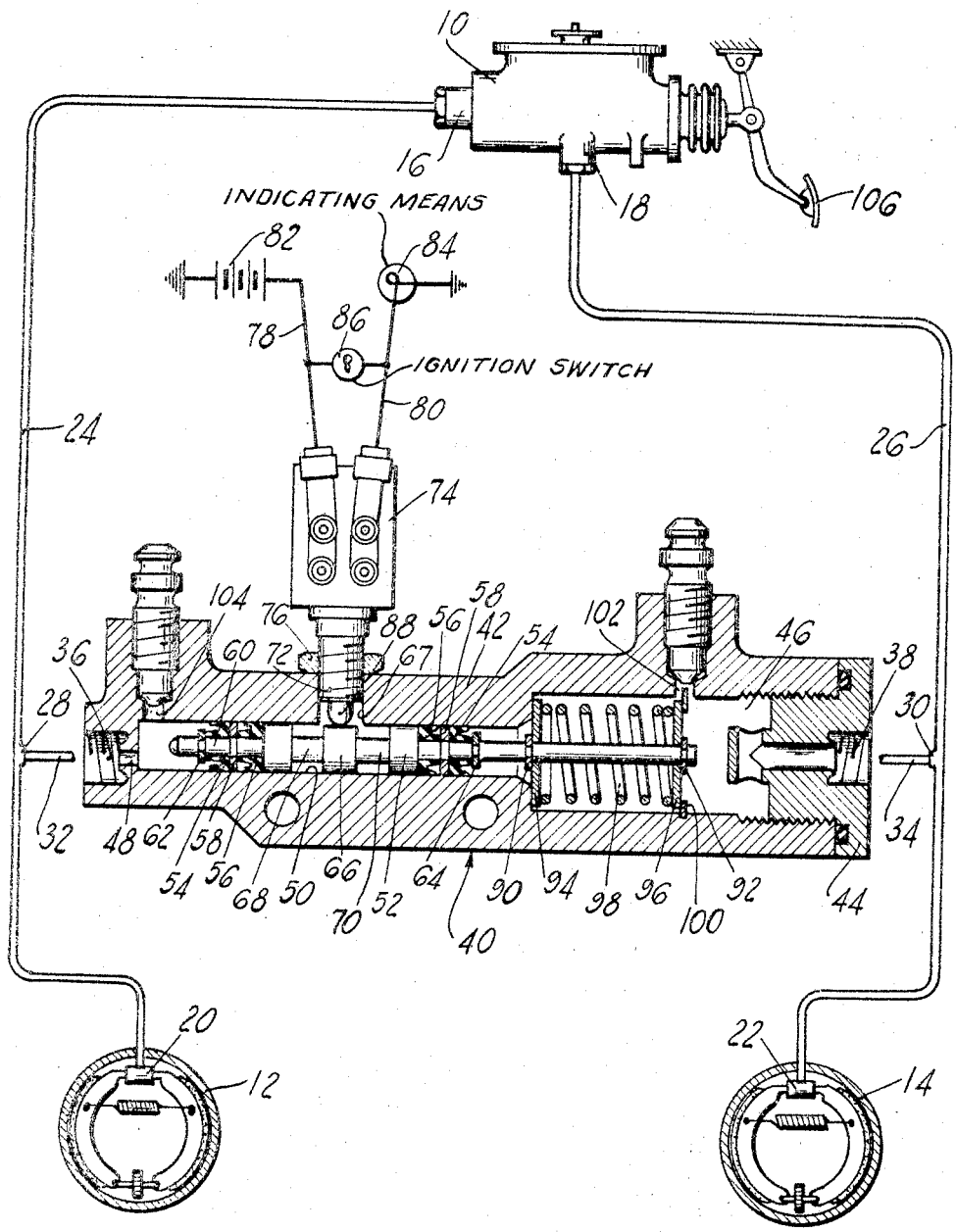
INVENTOR.
THOMAS A. BRANDON, JR.
BY
Richard G. Geib
ATTORNEY

United States Patent Office 3,427,582
Patented Feb. 11, 1969

3,427,582
**FAILURE INDICATING APPARATUS FOR
A SPLIT BRAKE SYSTEM**
Thomas A. Brandon, Jr., South Bend, Ind., assignor to
The Bendix Corporation, a corporation of Delaware
Filed Oct. 7, 1965, Ser. No. 493,712
U.S. Cl. 340—52                    10 Claims
Int. Cl. B60q 1/50

ABSTRACT OF THE DISCLOSURE

A pressure responsive means for a dual hydraulic system positioned by a caged spring and subjected to separate pressures at each end thereof having a switch means associated therewith so that upon a variance of pressure at each end thereof the shifting of the pressure responsive means will actuate the switch means to close an electrical circuit to an indicating lamp or similar device.

---

It is a principal object of this invention to provide a means to indicate a failure in a multiple fluid system such as a split brake system so that any malfunctions can be observed prior to complete failure of braking pressures.

It is another object to provide a failure indicator which is inexpensive to manufacture due to utilization of a caged spring principle.

It is a further object to provide a failure indicator system with means to check the system periodically.

It is yet another object to provide a hydraulic failure indicator which will eliminate wear to hydraulic piston seals by utilization of a preloaded caged spring.

Other objects and advantages will appear to those skilled in the art to which the invention relates from a following description of the drawing showing one of many systems in schematic form in which a cross sectional detail of a device according to the principles of the invention is assembled.

More specifically, there is shown a use which has been utilized to prove the concept of my invention, namely a split braking system generally comprising a master cylinder 10 that generates at least two independent pressures for operating a set of front wheel brakes 12 and a set of rear wheel brakes 14. The fluid pressures from a pair of ports 16 and 18 is delivered to wheel cylinders 20 and 22 of the respective brakes 12 and 14 by means of conduits 24 and 26.

These conduits 24 and 26 are tapped, as at 28 and 30, to receive branch conduits 32 and 34 leading to inlet ports 36 and 38 of an indicating device 40. As seen, the inlet port 36 is machined in housing 42 forming the body of the device 40; whereas the inlet 38 is machined in an end plug 44 joined to the body by a threaded and sealed connection. In fact, the plug 44 closes a spring chamber 46 and permits assembly of all parts to be operatively arranged in the body 42.

Adjacent the inlet 36 and connected thereto by a drilled passage 48 there is a bore 50 machined in the body to lead from chamber 46 to the passage 48. Within this bore 50 there is reciprocally arranged a two-way piston 52 that has at each end a pair of piston cup seals 54 and 56 separated by a washer 58. The piston 52, plates 58 and seals 54 and 56 are assembled on a rod 60 and held between a pair of retainer rings 62 and 64.

When in the bore the piston 52 has a central portion 66 underlying a radial opening 67 in housing 42. To each side of the portion 66, the piston is provided with stepped down portions 68 and 70 that may be machined on a lathe whose function will be described below.

The radial opening 67 is provided with threads to receive a threaded extension 72 of an electrical switch 74 and locked thereto by a lock nut 76. The switch includes a set of normally open contacts (not shown) which are respectively connected by electrical leads 78 and 80 to a power source 82 and an indicating means 84, i.e., a light or buzzer for visual or audible observance within the passenger compartment of a vehicle. It should be noted that the leads 78 and 80 are bridged through a starter switch 86, such as a vehicle's ignition switch, to momentarily activate the indicating means periodically. That is, every time the ignition switch is rotated to the start position the light or buzzer 84 would come on.

In order to close the contacts and activate the switch 74, a spring biased plunger 88 is reciprocally arranged in the switch to normally overlie the central portion 66 of piston 52.

The rod 60 extends to the right through the piston 52 into spring chamber 46 and is notched at spaced points to receive another pair of retaining rings 90 and 92 that unite on their inward sides a pair of spring bearing plates 94 and 96, respectively, to the rod 60. These plates may be notched, elliptical or incorporate holes to permit ready fluid flow therethrough and/or therearound. In any event a compression spring 98 is contained by the springs, and the inner face of chamber 46 and a stop ring 100 fixed to housing 42 adjacent an air bleed opening 102 act to limit the maximum distance spring 98 will maintain plates 92 and 94 from each other. Further, plates 92 and 94 have a central opening through which rod 60 is projected that is sized to permit friction free movement of one plate towards the other.

Before passing onto the operation of the invention it should be noted that there is another bleed port 104 communicated with the bore 50 adjacent the drilled passage 48. In these openings bleed valves of a common variety are assembled to the housing for obvious reasons, considering those skilled in the art pertaining to this embodiment of the invention.

In operating an indicating system according to the foregoing description, one first depresses the brake pedal 106 to generate independent pressures for conduits 24 and 26 and thereby, via wheel cylinders 20 and 22, expand the brakes 12 and 14 to decelerate the associated vehicle. Simultaneously these independent pressures are communicated to each side of piston 52. If all is normal, one experiences no more than one should in braking an automobile, but if one of the pressures drops off, the other pressure creates a pressure differential across piston 52. At first, this differential will not overcome forces of spring 98 due to its preloaded force, but as further effort is applied to pedal 106, the pressure compresses spring 98 to move central portion 66 from underneath finger 88 until one of the stepped down portions 68 or 70 underlies finger 88. At this time, and as finger 88 is spring or otherwise biased downwardly, the finger 88 is projected in to one or the other of the recessed portions 68 or 70. This closes the electrical circuit shown and the vehicle operator is immediately warned of a brake system problem by indicator 84. Furthermore, as finger 88 is in one or the of the reduced diameter portions 68 or 70, the piston 52 is locked and the indicator light will stay on until the brake system is repaired and device 40 is manually reset by the repairman. As shown to reset, one would have to loosen nut 76 and unscrew switch 74 from the housing 42 until spring 98 snaps piston 52 back to its normal position shown in bore 50. If desired, an exterior means could be provided on switch 74 to raise finger 88 with less trouble to the mechanic.

I claim:

1. A failure indicating system for a multiple fluid pressure system comprising:
   a means to generate at least two independent pressures,
   a means to utilize each of the independent pressures; and
   an indicator means interposed with a means to generate and a means to utilize the independent pressures, said indicator means including,
   an electrical system including a switch means and an indicator,
   a two-way piston means having one end subjected to one of said independent pressures, and another end subjected to another of said independent pressures,
   a push-pull spring operatively connected to one end only of said two-way piston means to resist movement of said piston in all directions of said two-way piston means permitted travel.

2. A failure indicating system according to claim 1 wherein said switch means includes a spring loaded plunger operatively connected to said piston means as to ride on a raised surface so long as said means generating two independent pressures is fully operative and which will close said switch whenever one or another of said independent pressures fall below a value.

3. A failure indicating system according to claim 2 and further comprising a means to test said indicator for working conditions periodically.

4. A failure indicating system according to claim 1 wherein the operative connection between one end of said two-way piston means and said push-pull spring includes:
   a rod projecting from said one end of said piston means;
   a pair of spring retainer rings on said rod and spaced from each other;
   a pair of reciprocal spring bearing plates containing said push-pull spring means between them such that any movement of said rod tends to compress said spring; and
   stop means operatively connected to said spring bearing plates to resist movement of same away from each other.

5. A failure indicating system according to claim 1 wherein said push-pull spring is a caged compression spring.

6. A failure indicating system according to claim 1 wherein said push-pull spring is a preloaded caged compression spring.

7. A fluid pressure differential indicator comprising:
   a housing having fluid inlets;
   a movable means in said housing between said inlets;
   a caged spring operatively connecting one end only of said movable means to said housing such that said movable means is retained in one position in said housing so long as there is no substantial pressure differential thereacross; and
   a switch means operatively connected to said movable means to be actuated thereby whenever substantial pressure differential exists across said movable means.

8. The structure according to claim 7 wherein said movable means is characterized as a piston having a rod extending from one end thereof.

9. The structure according to claim 8 wherein said caged spring comprises a spring mounted between spring bearing plates that abuttingly contact said housing to be movable one towards the other such that said piston is restrained solely by said spring at said one end from moving in either direction in said housing.

10. The structure of claim 9 wherein said switch means includes a spring biased plunger cooperating with a central portion of said piston that is raised between recessed portions so that said plunger will mechanically lock said piston from returning to its centered position after said central portion has been moved by a substantial pressure differential across said piston and said plunger has dropped into any one of said recessed portions whereupon said switch means is actuated.

References Cited

UNITED STATES PATENTS 3,148,364  9/1964  Engels et al. _____ 340—242
3,228,194  1/1966  Blair.

ALVIN H. WARING, *Primary Examiner.*

U.S. Cl. X.R.

340—242; 200—82